(12) United States Patent
Zhang (10) Patent No.: US 11,068,720 B2
(45) Date of Patent: Jul. 20, 2021

(54) METHOD AND APPARATUS FOR ADDING AUGMENTED REALITY DATA IN LIVE VIDEO, AND STORAGE MEDIUM

(71) Applicant: BAIDU ONLINE NETWORK TECHNOLOGY (BEIJING) CO., LTD., Beijing (CN)

(72) Inventor: Yan Zhang, Beijing (CN)

(73) Assignee: BAIDU ONLINE NETWORK TECHNOLOGY (BEIJING) CO., LTD.

(*) Notice: Subject to any disclaimer, the term of this patent is extended or adjusted under 35 U.S.C. 154(b) by 46 days.

(21) Appl. No.: 16/509,889

(22) Filed: Jul. 12, 2019

(65) Prior Publication Data

US 2019/0340439 A1  Nov. 7, 2019

(30) Foreign Application Priority Data

Aug. 27, 2018 (CN) .......................... 201810980267.X (51) Int. Cl.
*G06K 9/00* (2006.01)

(52) U.S. Cl.
CPC ..... *G06K 9/00724* (2013.01); *G06K 9/00671* (2013.01); *G06K 9/00744* (2013.01); *G06K 2009/00738* (2013.01)

(58) Field of Classification Search
CPC ..... G06K 2009/00738; G06K 9/00671; G06K 9/00724; G06K 9/00744; G06K 9/00342; G06K 9/00751; A63B 2024/0068; A63B 24/0062; A63B 71/0619; A63F 13/211; A63F 13/212; A63F 13/213; A63F 13/25; A63F 13/355; A63F 13/65; A63F 13/812; A63F 2300/8082; G06T 7/20; H04N 21/2187; H04N 21/237; H04N 21/2665;
(Continued)

(56) References Cited

U.S. PATENT DOCUMENTS 10,531,137 B1 * 1/2020 Matak .................. A63F 13/211
2009/0262137 A1 * 10/2009 Walker .................. H04H 60/04
345/629
(Continued)

FOREIGN PATENT DOCUMENTS

CN 101098465 A 1/2008
CN 106331880 A 1/2017
(Continued)

OTHER PUBLICATIONS

CN Office Action; Application No. 201810980267.X; dated Nov. 22, 2019; 5 pages.

*Primary Examiner* — Jessica M Prince
(74) *Attorney, Agent, or Firm* — Dilworth IP, LLC (57) ABSTRACT

The present application provides a live video processing method and apparatus, and a storage medium, where the method includes: obtaining first video information corresponding to a first moment; determining according to the first video information, an identifier of a predicted event corresponding to second video information, displaying, according to the identifier of the predicted event, AR data corresponding to the predicted event in a second video live screen of the second moment. The method and apparatus enhance the enjoyability of the live video, improve the viewing experience of the remote audiences, and increase the intensity of the game.

20 Claims, 4 Drawing Sheets

(58) Field of Classification Search
CPC ....... H04N 21/41407; H04N 21/43074; H04N 21/4312; H04N 21/812; H04N 21/8133; H04N 21/8146; H04N 21/816; H04N 21/85; H04N 7/18; H04N 7/181; G08B 21/0492
See application file for complete search history.

(56) References Cited

U.S. PATENT DOCUMENTS

2016/0219325 A1    7/2016  Chu et al.
2018/0054659 A1*   2/2018  Goswami ............. H04N 21/816

FOREIGN PATENT DOCUMENTS

CN    106804007 A    6/2017
CN    107360160 A    11/2017

* cited by examiner

METHOD AND APPARATUS FOR ADDING AUGMENTED REALITY DATA IN LIVE VIDEO, AND STORAGE MEDIUM

CROSS-REFERENCE TO RELATED APPLICATION

This application claims priority to Chinese Patent Application No. 201810980267.X, filed on Aug. 27, 2018, which is hereby incorporated by reference in its entirety.

FIELD

The present application relates to the field of information processing technologies, and in particular, to a live video processing method and apparatus, and a storage medium.

BACKGROUND

With the flourishing development of sports events, the entire sports industry chain has been growing constantly, and live broadcasting systems for sports events have also been widely used. As the world's high-level sports competitions attract the attention of sports fans, how to rapidly achieve live broadcast for different sports with a high quality is becoming more and more important.

In the prior art, the live screen of the live broadcast system for a sports event cannot be superimposed with special effects in real time, and superimposition is generally performed by post-production, that is, by adding special effects at certain moments of the video screen of the event, so as to enhance the audiences' viewing experience.

However, the existing method of adding special effects to the video screen after the event has poor timeliness and affects the audiences' viewing experience.

SUMMARY

The present application provides a live video processing method and apparatus, and a storage medium to overcome the existing problem of a poor timeliness and viewing experience due to the addition of special effects to a live video in post-processing after the event.

A first aspect of the present application provides a live video processing method including:
obtaining first video information corresponding to a first moment, the first video information including a first video live screen;
determining, according to the first video information, an identifier of a predicted event corresponding to second video information; where the second video information corresponds to a second moment, and the second moment is after the first moment;
displaying, according to the identifier of the predicted event, augmented reality (AR) data corresponding to the predicted event in a second video live screen of the second moment.

Optionally, in a possible implementation manner of the first aspect, the determining, according to the first video information, an identifier of a predicted event corresponding to second video information includes:
performing analysis processing on the first video information to obtain the first video live screen,
inputting the first video live screen into a video analysis model for analysis to obtain the identifier of the predicted event, where the video analysis model is obtained by training with a live screen of a historical video.

Optionally, in the foregoing possible implementation manner of the first aspect, the method further includes:
obtaining an accuracy of the predicted event; and
optimizing the video analysis model according to the accuracy of the predicted event.

Optionally, in another possible implementation manner of the first aspect, the displaying, according to the identifier of the predicted event, AR data corresponding to the predicted event in a second video live screen of the second moment includes:
obtaining the AR data corresponding to the predicted event according to the identifier of the predicted event,
superimposing the AR data onto the second video information; and
controlling the AR data to be displayed in the second video live screen of the second moment.

Optionally, in previous possible implementation manners of the first aspect, the obtaining the AR data corresponding to the predicted event according to the identifier of the predicted event includes:
querying an AR database according to the identifier of the predicted event, and determining the AR data corresponding to the predicted event.

Optionally, the AR database stores AR data corresponding to various prediction events.

Optionally, in another possible implementation manner of the first aspect, before superimposing the AR data onto the second video information, the method further includes:
obtaining the second video information corresponding to the second moment;
analyzing the second video information to determine a current event in the second video information; and
determining whether the current event is the predicted event;
correspondingly, the superimposing the AR data onto the second video information includes:
superimposing the AR data on the second video information when the current event is the predicted event.

Optionally, in another possible implementation manner of the first aspect, the obtaining first video information corresponding to a first moment includes:
obtaining at least two pieces of video information respectively collected by at least two video capture apparatuses at the first moment, where the at least two video capture apparatuses are video capture apparatuses which are disposed in a same scene but at different locations;
performing integration processing on the at least two pieces of video information to obtain the first video information.

Optionally, the AR data may include textual data, chartlet data, voice data, and animation data.

Optionally, the live video is a live video of a sports game.

A second aspect of the present application provides a live video processing apparatus, including: an obtaining module, a determining module, and a processing module;
the obtaining module is configured to obtain first video information corresponding to a first moment, the first video information including a first video live screen;
the determining module is configured to determine, according to the first video information, an identifier of a predicted event corresponding to second video information, where the second video information corresponds to a second moment, and the second moment is after the first moment.
the processing module is configured to display, according to the identifier of the predicted event, augmented reality (AR) data corresponding to the predicted event in a second video live screen of the second moment.

Optionally, in a possible implementation manner of the second aspect, that the determining module is configured to determine, according to the first video information, an identifier of a predicted event corresponding to second video information is specifically:

the determining module is specifically configured to perform analysis processing on the first video information to obtain the first video live screen, input the first video live screen into a video analysis model for analysis to obtain the identifier of the predicted event, where the video analysis model is obtained by training with a live screen of a historical video.

Optionally, in previous possible implementation manners of the second aspect, the obtaining module is further configured to obtain an accuracy of the predicted event;

the processing module is further configured to optimize the video analysis model according to the accuracy of the predicted event.

Optionally, in another possible implementation manner of the second aspect, that the processing module is configured to display, according to the identifier of the predicted event, AR data corresponding to the predicted event in a second video live screen of the second moment is specifically:

the processing module is further configured to obtain the AR data corresponding to the predicted event according to the identifier of the predicted event, superimpose the AR data onto the second video information; control the AR data to be displayed in the second video live screen of the second moment.

Optionally, in previous possible implementation manners of the second aspect, that the processing module is configured to obtain the AR data corresponding to the predicted event according to the identifier of the predicted event is specifically:

the processing module is specifically configured to query an AR database according to the identifier of the predicted event, and determine the AR data corresponding to the predicted event.

Optionally, the AR database stores the AR data corresponding to various prediction events.

Optionally, in another possible implementation manner of the second aspect, the obtaining module is further configured to obtain the second video information corresponding to the second moment before the processing module superimposes the AR data on the second video information;

the processing module is further configured to analyze the second video information to determine a current event in the second video information; determine whether the current event is the predicted event;

correspondingly, that the processing module is configured to superimpose the AR data onto the second video information is specifically:

the processing module is specifically configured to superimpose the AR data on the second video information when the current event is the predicted event.

Optionally, in another possible implementation manner of the second aspect, that the obtaining module is configured to obtain first video information corresponding to a first moment includes:

the obtaining module is specifically configured to obtain at least two pieces of video information respectively collected by at least two video capture apparatuses at the first moment, perform integration processing on the at least two pieces of video information to obtain the first video information; where the at least two video capture apparatuses are video capture apparatuses which are disposed in a same scene but at different locations;

Optionally, the AR data may include textual data, chartlet data, voice data, and animation data.

Optionally, the live video is a live video of a sports game.

A third aspect of the present application provides a live video processing apparatus, including a processor, a memory, and a computer program stored on the memory and executable on the processor, where when executing the program, the processor implements the method according to any one of the first aspect and the implementation manners of the first aspect.

A fourth aspect of the present application provides a storage medium, where the storage medium stores instructions that, when run on a computer, cause the computer to perform the method according to any one of the first aspect and the implementation manners of the first aspect.

In the live video processing method and apparatus, and the storage medium provided by the embodiments of the present application, the first video information corresponding to the first moment is obtained, then the identifier of the predicted event corresponding to the second video information is determined according to the first video information, and according to the identifier of the predicted event, the AR data corresponding to the predicted event is displayed in the second video live screen of the second moment, thus the purpose of enabling the audiences who watch the live video to watch or listen to the added special effect information is achieved, therefore the technical solution enhances the enjoyability of the live video, improves the viewing experience of the remote audiences, and increases the intensity of the game.

DETAILED DESCRIPTION

In order to make the objective, technical solution and advantages of the embodiments of the present application more clear, the technical solutions in the embodiments of the present application are clearly and completely described in the following with reference to the accompanying drawings in the embodiments of the present application. It is apparent that the described embodiments are part rather than all of the embodiments of the present application. All other embodiments obtained by a person of ordinary skill in the art based on the embodiments of the present application without resorting to inventive efforts fall in the scope of the present application.

Figure 1:
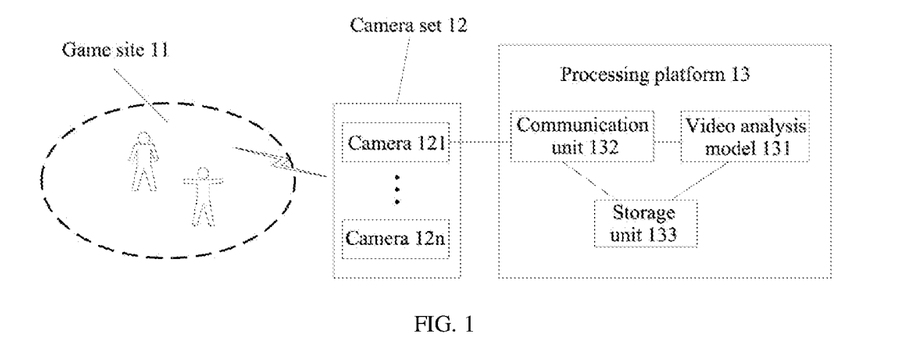
FIG. 1 is a schematic structural diagram of a video processing system according to an embodiment of the present application.

The live video processing method provided by the embodiments of the present application is applied to a video processing system. FIG. 1 is a schematic structural diagram of a video processing system according to an embodiment of the present application. As shown in FIG. 1, the video processing system includes a game site 11, a camera set 12 and a processing platform 13 which are disposed on the game site 11. Optionally, the camera set 12 may include at least one camera that is disposed at different locations on the game site 11.

Optionally, in this embodiment, each camera of the camera set 12 can capture the video of the game site 11 soonest to obtain first video information, and send the obtained first video information to the processing platform 13, so that a video analysis model 131 of the processing platform 13 processes the received first video information and determines an identifier of a predicted event corresponding to second video information, where a second moment corresponding to the second video information is later than the first moment. Then, the processing platform 13 obtains augmented reality (AR) data corresponding to the predicted event according to the identifier of the predicted event, and superimposes the AR data on the second video information, so that the live video of the game site 11 has a special effect at the second moment, which enhances the audiences' viewing experience.

Optionally, as shown in FIG. 1, the processing platform 13 may include a video analysis model 131, a communication unit 132, and a storage unit 133. The embodiment shown in FIG. 1 is described by taking the case as an example where the camera set 12 includes n cameras and the processing platform 13 includes a video analysis model, a communication unit, and a storage unit.

Optionally, in the video processing system shown in FIG. 1, for example, the video of the game site 11 is captured by a camera 121 in the camera group 12. Specifically, the first video information of the game site 11 is obtained by using the camera 121, and is sent to the processing platform 13; after receiving the first video information, the communication unit 132 of the processing platform 13 transfers the first video information to the video analysis model 131, and the video analysis model 131 performs corresponding processing to obtain an identifier of the predicted event, and obtains the AR data corresponding to the predicted event according to the identifier of the predicted event, and finally displays the AR data in the second live video screen of the second moment. Optionally, the identifier of the predicted event and the AR data corresponding to the predicted event may be stored in the storage unit 133.

Optionally, the video analysis model 131 of the processing platform 13 may be a processor having a processing function, which can not only perform event prediction on the received video information, but also transmit shooting instructions to the camera set 12 through the communication unit 132 at a specific moment, thus controlling the camera to capture video information at the specific moment. The content of the specific operation of the video analysis model 131 is not limited in the embodiment of the present application, and may be determined according to actual needs. Optionally, the video analysis model 131 may be implemented by a processor or a controller. For example, the video analysis model 131 may be implemented by any one of, or by any combination of at least two of a central processing unit (CPU), a general-purpose processor and a digital signal processor (DSP).

The communication unit 132 of the processing platform 13 is configured to implement the communication between the processing platform 13 and the camera set 12. The communication unit 132 may be a communication interface, a transceiver, a transceiver circuit, or the like. It can be understood that the communication interface referred to herein is a collective name and may include one or more interfaces.

The storage unit 133 of the processing platform 13 is configured to store data. The storage unit 133 may be, for example, an LU, an FS or the like partitioned on the processing platform 13, that is, the LU or the FS logically partitioned on the physical storage of the processing platform 13, where the FS mentioned here is an FS, such as a shared folder, that can provide access services to the camera set through the network.

Optionally, the processing platform in the embodiment of the present application may be implemented in such a way that along with other hardware entities, a processor on the terminal device executes corresponding software codes, or may be implemented by a server, which is not limited by the embodiment of the present application.

The embodiment of the present application provides a live video processing method, aiming at the problem of a poor timeliness and viewing experience due to the addition of special effects to the live video in post-processing after the event. The steps of obtaining the first video information at the game site, determining the identifier of the predicted event of the second video information using the first video information, obtaining the AR data corresponding to the predicted event, and displaying the AR data on the live video screen corresponding to the second video information achieve the purpose of superimposing special effects in the live video screen, improve the viewing experience of remote audiences and increase the game intensity.

The technical solution of the present application is described in detail by using a video processing system shown in FIG. 1 through embodiments. It should be noted that the following embodiments may be combined with each other, and the same or similar concepts or processes may not be described in some embodiments. Embodiments of the present application will be described below with reference to the accompanying drawings.

It can be understood that, in the following embodiments, the processing actions of the processing platform are implemented by the processing unit of the processing platform, and the communication between the processing platform and the camera set is implemented by the communication unit of the processing platform, which will not be described in the following description.

Figure 2:
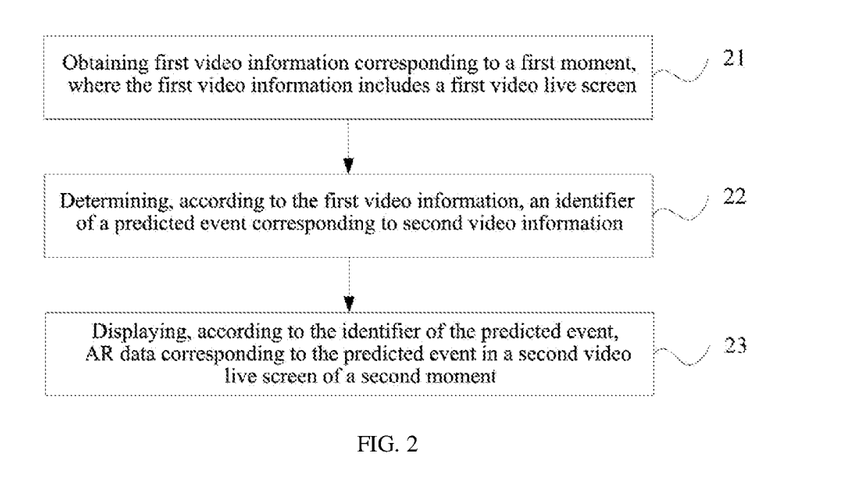
FIG. 2 is a flowchart of Embodiment 1 of a live video processing method according to an embodiment of the present application.

FIG. 2 is a flowchart of Embodiment 1 of a live video processing method according to an embodiment of the present application. The executive body of the method embodiment may be the processing platform in the video processing system shown in FIG. 1 above. As shown in FIG. 2, the live video processing method provided by the embodiment of the present application may include the following steps.

Step 21: obtaining first video information corresponding to a first moment, where the first video information includes a first video live screen.

Optionally, in the embodiment of the present application, in order to enable the national or global audiences to pay attention to the situation of the game site in real time, a camera set is disposed on the game site, so that the camera set can be used to capture the video information of the game site.

Optionally, when it is required to predict an event that may occur at a second moment, the first video information corresponding to the first moment may be first obtained. It can be understood that the first video information needs to include the first video live screen corresponding to the first moment, so that the processing platform can process according to the first video live screen corresponding to the first video information to determine the identifier of the predicted event corresponding to the second video information of the second moment.

Optionally, as an example, the step (of obtaining first video information corresponding to a first moment) may be specifically implemented as follows.

Step A1: obtaining at least two pieces of video information respectively collected by the at least two video capture apparatuses at the first moment.

The at least two video capture apparatuses are video capture apparatuses that are disposed in a same scene but at different locations.

Step A2: performing integration processing on the at least two pieces of video information to obtain the first video information.

Optionally, different video capture apparatuses can be disposed at different locations on the game site. For example, the number of video capture apparatuses disposed at the game site can be at least two. Therefore, the video information of different angles can be collected by the at least two disposed video capture apparatuses, and sent to the processing platform, and then the integration processing is performed on the at least two pieces of video information by to obtain the first video information corresponding to the first moment.

Optionally, the video capture apparatus in this embodiment may be a binocular camera or a monocular camera. One or more video capture apparatuses may be placed at each of the different locations on the game site. The specific number of the video capture apparatuses may be set according to actual conditions, which is not limited in this embodiment.

Step 22: determining, according to the first video information, an identifier of a predicted event corresponding to second video information.

The second video information corresponds to a second moment, and the second moment is after the first moment.

Optionally, after obtaining the first video information, the processing platform first determines the first video live screen by analyzing the first video information, and then predicts, according to an occurrence in the first video live screen, an event that may occur at a second moment. In this embodiment, the video information obtained by the video capture apparatus at the second moment is referred to as second video information. Thus, after predicting an event that may occur at the second moment, an identifier of a predicted event corresponding to the second video information may be determined.

Optionally, the processing platform of the embodiment of the present application may be implemented by a terminal device or a server, therefore the identifier of the predicted event may be obtained through the analysis of the first video information performed by the terminal device or the server. For a specific implementation of determining, by the processing platform, the identifier of the predicted event corresponding to the second video information, reference can be made to the description in the embodiment shown in FIG. 2 below, and details are not described herein.

Step 23: displaying, according to the identifier of the predicted event, augmented reality (AR) data corresponding to the predicted event in a second video live screen of a second moment.

Optionally, in the embodiment of the present application, after the processing platform determines the identifier of the predicted event corresponding to the second video information, the processing platform may obtain augmented reality (AR) data corresponding to the predicted event according to the identifier of the predicted event, and further enable the AR data to be displayed in the second video live screen of the second moment by superimposing the AR data on the second video information.

Optionally, in the embodiment of the present application, the AR data may include any one or more of various data, such as textual data, chartlet data, voice data, and animation data. Correspondingly, the processing platform may display the textual data and/or the chartlet data and/or the voice data and/or the animation data corresponding to the predicted event in the second live video screen corresponding to the second video information. It can be understood that the embodiment of the present application does not limit the representation of the foregoing AR data, which may be determined according to the form of the AR data stored by a video editor in the processing platform.

In the live video processing method provided by the embodiment of the present application, the first video information corresponding to the first moment is obtained, then the identifier of the predicted event corresponding to the second video information is determined according to the first video information, and according to the identifier of the predicted event, the AR data corresponding to the predicted event is displayed in the second video live screen of the second moment. The technical solution can directly add special effects and the like to the video information collected on the game site, so that the audiences who watch the live video can simultaneously watch or listen to the added special effect information, therefore the technical solution enhances the enjoyability of the live video, improves the viewing experience of the remote audiences, and increases the intensity of the game.

Figure 3:
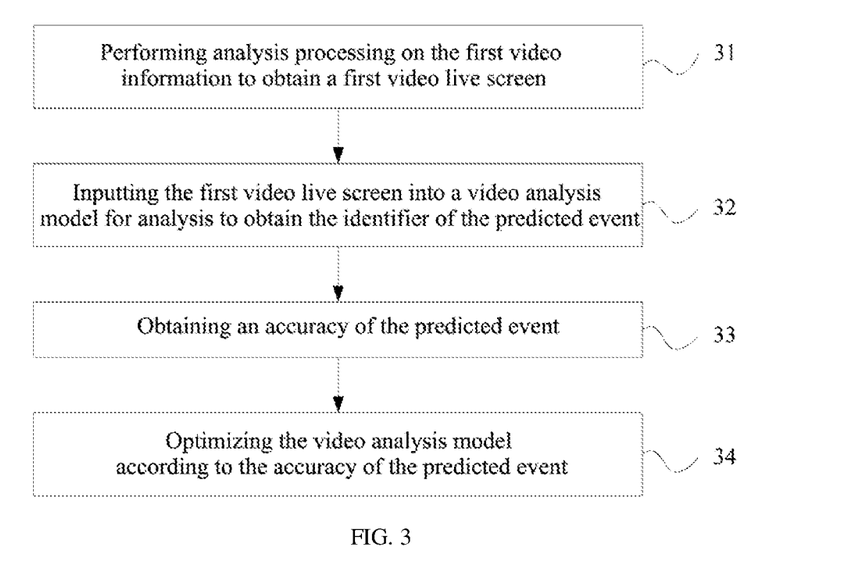
FIG. 3 is a flowchart of Embodiment 2 of a live video processing method according to an embodiment of the present application.

Optionally, based on the above embodiment, FIG. 3 is a flowchart of Embodiment 2 of a live video processing method according to an embodiment of the present application. As shown in FIG. 3, in the live video processing method provided in this embodiment, the foregoing Step 22 (determining, according to the first video information, an identifier of a predicted event corresponding to second video information) may be implemented by the following steps.

Step 31: performing analysis processing on the first video information to obtain a first video live screen.

Optionally, in this embodiment, after obtaining the first video information, the processing platform may obtain the first video live screen of the first video information by using a computer image visual analysis technology and locating a live screen of the game site.

It can be understood that the specific operation of the analysis processing performed by the processing platform on the first video information may be determined according to the capabilities of the processing platform and the characteristics of the first video information, and details are not described herein again.

Step 32: inputting the first video live screen into a video analysis model for analysis to obtain the identifier of the predicted event.

The video analysis model is obtained by training with a live screen of a historical video.

Optionally, in the embodiment of the present application, after obtaining the first video live screen of the game site, the processing platform (for example, an electronic device or a server) may input the first video live screen to the video analysis model operating on the processing platform, and the video analysis model performs event prediction to obtain an identifier of the predicted event.

It should be noted that, the video analysis model operating on the processing platform is obtained by training with a live screen of a historical video. Specifically, a convolutional neural networks (CNNs) structure, specifically a deep convolutional neural network may be adopted for the video analysis model. Optionally, when the video analysis model is trained, a live screen of an obtained historical video may be used as an input of the video analysis model. An identifier of a predicted event of the historical video information corresponding to a certain moment after the live screen of the historical video is used as an output of the video analysis model, and a video analysis model is obtained based on the deep learning capability of big data.

In this embodiment, the first video live screen is obtained by analyzing the first video information, and is input into the video analysis model for analysis to obtain the identifier of the predicted event, where the video analysis model is obtained by training the live screen of the historical video. The technical solution automatically predicts the identifier of the predicted event corresponding to the second video information by means of the video analysis model, and can timely determine the predicted event that may occur at the second moment, which provides an implementation possibility for adding special effects to the second video information.

Optionally, in a possible implementation manner of the embodiment of the present application, after the step 32 (inputting the first video live screen into a video analysis model for analysis to obtain an identifier of a predicted event), the live video processing method may further include the following steps.

Step 33: obtaining an accuracy of the predicted event.

Optionally, after obtaining the identifier of the predicted event, and an identifier according to an actual event that occurs at the second moment, the processing platform may compare the identifier of the predicted event corresponding to the second moment with the identifier of the actual event, and determine whether they are consistent with each other, to determine the accuracy of the predicted event. Optionally, the processing platform may further process the video analysis model according to the accuracy of the predicted event.

Step 34: optimizing the video analysis model according to the accuracy of the predicted event.

Optionally, when the identifier of the predicted event at the second moment obtained by the processing platform by using the video analysis model is inconsistent with the identifier of the actual event at the second moment, the processing platform may input the identifier of the first video live screen and the identifier of the actual event occurring at the second moment into the video analysis model to optimize the video analysis model and improve the prediction accuracy of the video analysis model.

In the embodiment of the present application, the accuracy of the foregoing predicted event is obtained, and the video analysis model is optimized according to the accuracy of the predicted event, thus the prediction accuracy of the video analysis model in the processing platform is improved, which lays a foundation for adding AR data of a correctly predicted event at certain moments subsequently, and improves the enjoyability of the live video as well as the audiences' viewing experience.

Figure 4:
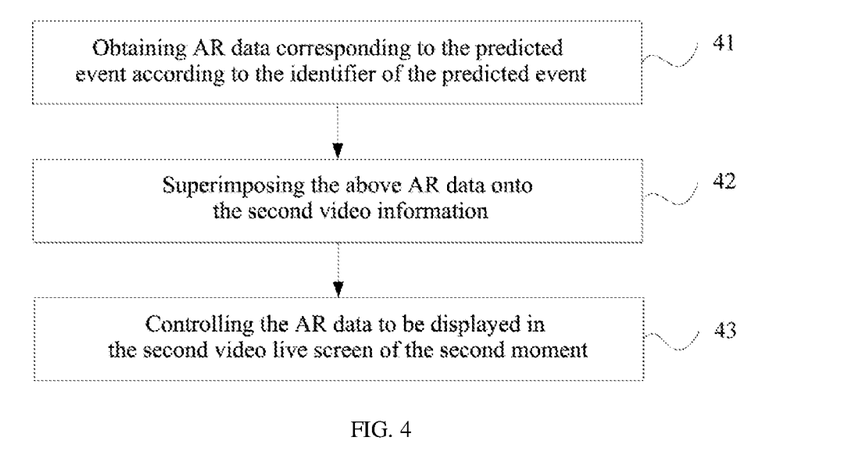
FIG. 4 is a flowchart of Embodiment 3 of a live video processing method according to an embodiment of the present application.

Optionally, based on the foregoing embodiment, FIG. 4 is a flowchart of Embodiment 3 of a live video processing method provided by an embodiment of the present application. As shown in FIG. 4, in the live video processing method provided in this embodiment, the step 23 (displaying, according to the identifier of the predicted event, augmented reality (AR) data corresponding to the predicted event in a second video live screen of a second moment) may be implemented by the following steps:

Step 41: obtaining AR data corresponding to the predicted event according to the identifier of the predicted event.

Optionally, in this embodiment, after determining the identifier of the predicted event corresponding to the second video information according to the first video information, the processing platform may correspondingly obtain the AR data corresponding to the predicted event from the storage location of the AR data corresponding to the predicted event according to the identifier of the predicted event.

Optionally, the storage location of the AR data may be the processing platform, or may be a storage system or a server different from the processing platform. Therefore, after determining the identifier of the predicted event, the processing platform may directly query the processing platform according to the identifier of the predicted event, and obtain the AR data corresponding to the predicted event. Alternatively, the processing platform may obtain AR data corresponding to the predicted event from the storage system or the server different from the processing platform according to the identifier of the predicted event.

It can be understood that the embodiment of the present application does not limit the storage location of the AR data corresponding to the predicted event, which may be determined according to actual needs, and details are not described herein again.

Optionally, as an example, the step 41 (obtaining AR data corresponding to the predicted event according to the identifier of the predicted event) may be implemented as follows:

querying an AR database according to the identifier of the predicted event, and determining the AR data corresponding to the predicted event.

Optionally, in this embodiment, an AR database is deployed in the processing platform. Before performing the live video processing method provided by the embodiment, the video editor may firstly predict all possible events and special effects that each event may need to render according to the actual game content held on the game site. Then the video editor can store all the predicted events and the AR data corresponding to each predicted event into the AR database. That is, the AR database stores the AR data corresponding to various prediction events.

Correspondingly, when the AR data corresponding to the various predicted events is stored in the AR database of the processing platform, the processing platform may query the AR database according to the identifier of the predicted event, so as to determine and obtain the AR data corresponding to the predicted event.

By storing the AR data corresponding to the various prediction events in the AR database of the processing platform, the prediction efficiency of determining the identifier corresponding to the prediction event by processing platform can be improved, the goodness of fit between the AR data and the second video image is further improved, and the enjoyability for the users is thus enhanced.

Step 42: superimposing the above AR data onto the second video information.

Optionally, in this embodiment, after determining, according to the first video information corresponding to the first moment, an identifier of the predicted event of the second video information (where the second video information corresponds to the second moment) and the AR data corresponding to the predicted event, the processing platform may, when obtaining the second video at the second moment, superimpose the AR data on the second video information in a superimposing manner so as to present the AR information along with the second video information to the audiences watching the live video.

Step 43: controlling the AR data to be displayed in the second video live screen of the second moment.

Optionally, after superimposing the foregoing AR data on the second video information, the processing platform may correspondingly determine, according to characteristics of the specific event in the second video information, whether the AR data corresponds to the second video information. And when the AR data corresponds to the second video information, the processing platform controls the AR data to be displayed in the second video live screen of the second moment, so that the audiences watching the live video can view the second video superimposed with the AR data special effect.

In the live video processing method provided by the embodiment of the present application, the steps of obtaining the AR data corresponding to the prediction event according to the identifier of the predicted event, superimposing the AR data on the second video information, and controlling the AR data to be displayed in second video live screen of the second moment, enable the AR data of the predicted event to be presented together with the second video information to the audiences watching the live video, which improves the enjoyability of the live video as well as the audiences' viewing effect.

Figure 5:
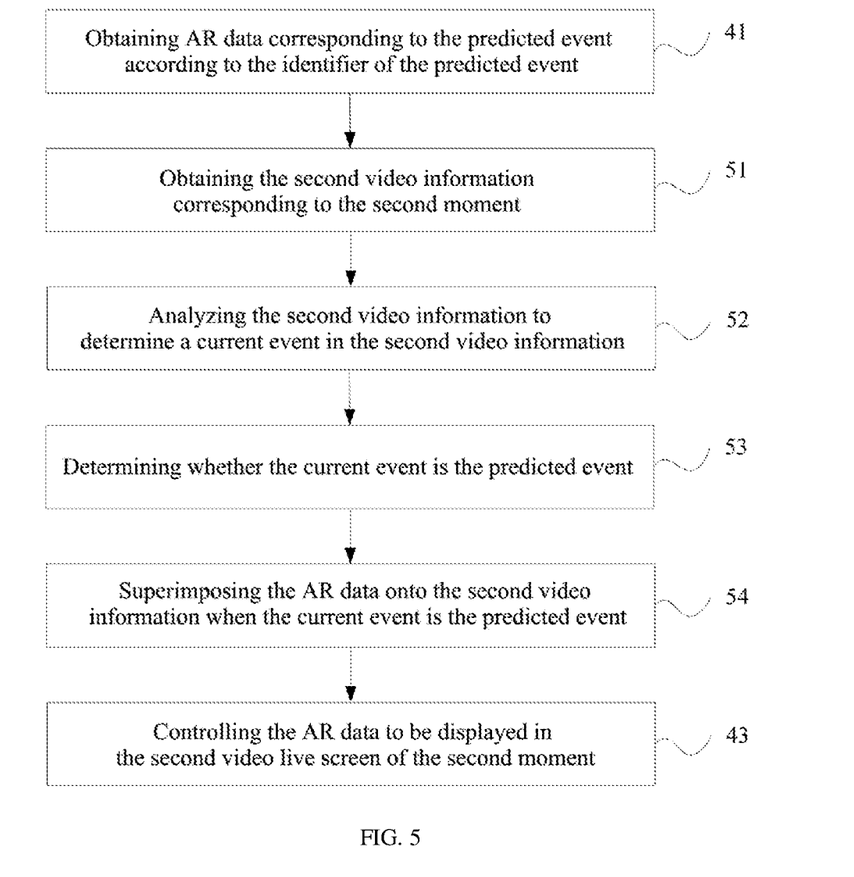
FIG. 5 is a flowchart of Embodiment 4 of a live video processing method according to an embodiment of the present application.

Optionally, based on the foregoing embodiment of FIG. 4, FIG. 5 is a flowchart of Embodiment 4 of a live video processing method provided by an embodiment of the present application. As shown in FIG. 5, before the step 42 (superimposing the AR data on the second video information), the live video processing method may further include the following steps Step 51: obtaining the second video information corresponding to the second moment.

Optionally, in this embodiment, the manner of obtaining the second video information is similar to that of obtaining the first video. Specifically, the processing platform may also obtain at least two pieces of video information captured at the second moment by at least two video capture apparatuses that are disposed on the game site, and integrate the at least two pieces of video information into the video information to obtain the second video information.

For the manner of obtaining the second video information, reference can be made to the description of step 21 in the embodiment shown in FIG. 2, and details are not described herein again.

Step 52: analyzing the second video information to determine a current event in the second video information.

Optionally, after obtaining the second video information corresponding to the second moment, the processing platform may determine the current event in the second video information through the analysis of the second video information and by means of the continuity of respective live scenes in the second video information.

Step 53: determining whether the current event is the predicted event.

Optionally, before playing the live screen of the second video information, the processing platform may compare the determined current event in the second video information with the predicted event corresponding to the second video information obtained according to the first video information, to determine whether the current event is the predicted event and obtain a determination result, and finally determine, according to the determination result, whether to superimpose the AR data of the predicted event on the second video information.

Correspondingly, the above step 42 (superimposing the above AR data onto the second video information) may be replaced by the following step.

Step 54: superimposing the AR data onto the second video information when the current event is the predicted event.

Optionally, in this embodiment, through the foregoing determining steps 51 to 53, the processing platform superimposes the obtained AR data of the predicted event onto the second video information when determining that the current event in the second video information is exactly the predicted event, thus displaying the augmented reality (AR) data corresponding to the predicted event in the second video live screen of the second moment.

In the live video processing method provided by the embodiment of the present application, the AR data is superimposed on the second video information, and the second video information corresponding to the second moment is obtained and analyzed to determine a current event in the second video information, then it is determined if the current event is the predicted event. When the current event is the above predicted event, the AR data is superimposed on the second video information. In the technical solution, after it is determined that predicted event is correct, the AR data is then superimposed on the second video information to ensure the correct location where the AR effect is added and the correct timing of the addition, which lays a foundation for improving the enjoyability of the live video.

Optionally, in a possible implementation manner of the embodiment of the present application, the live video in the embodiment may be a live video of a sports game.

Optionally, the sports game may be a ball game, such as basketball, volleyball, soccer, table tennis, and the like. Optionally, in this embodiment, taking basketball as an example, the predicted event may be a slam dunk, a steal, a free throw, a three-pointer, and the like.

It should be noted that the live video in the embodiment of the present application is not limited to a live video of a sports game, and may also be other live videos, such as videos of dance contests, sports meet, parties, and the like. The above ball sports are not limited to basketball, volleyball, soccer, table tennis, etc., but may also be baseball, rugby, billiard, and the like. The above predicted events for the basketball game are not limited to the slam dunk, the steal, the free throw, the three-pointer, etc., and may be other events. The activity of the live video, the type of the ball game, and the predicted event can be determined according to the actual situation, which is not limited by the embodiment of the present application.

The following are apparatus embodiments of the present application, which may be used to implement the method embodiments of the present application. For details not disclosed in the apparatus embodiments of the present application, reference can be made to the method embodiments of the present application.

Figure 6:
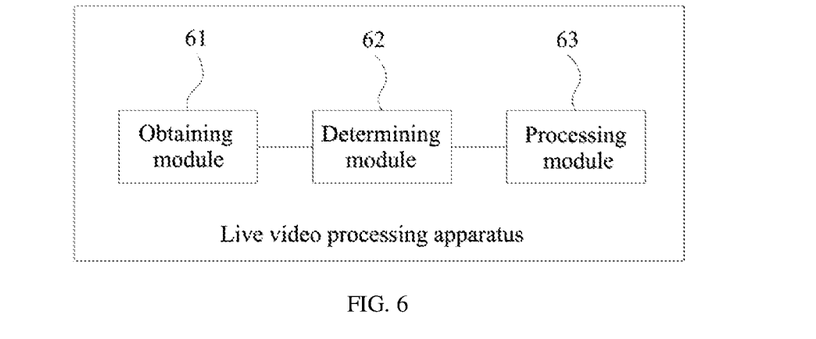
FIG. 6 is a schematic structural diagram of Embodiment 1 of a live video processing apparatus according to an embodiment of the present application.

FIG. 6 is a schematic structural diagram of Embodiment 1 of a live video processing apparatus according to an embodiment of the present application. In this embodiment, the live video processing apparatus may be integrated in a terminal device, or may be a terminal device, or may be integrated in a server or may be a server. Optionally, as shown in FIG. 6, the live video processing apparatus may include: an obtaining module 61, a determining module 62, and a processing module 63.

The obtaining module 61 is configured to: obtain first video information corresponding to a first moment, the first video information including a first video live screen.

The determining module 62 is configured to: determine, according to the first video information, an identifier of a predicted event corresponding to second video information, where the second video information corresponds to a second moment, and the second moment is after the first moment.

The processing module 63 is configured to: display, according to the identifier of the predicted event, augmented reality (AR) data corresponding to the predicted event in a second video live screen of the second moment.

Optionally, in a possible implementation manner of the embodiment of the present application, that the determining module 62 is configured to determine, according to the first video information, an identifier of a predicted event corresponding to second video information is specifically:

the determining module 62 is specifically configured to perform analysis processing on the first video information to obtain the first video live screen, input the first video live screen into a video analysis model for analysis to obtain the identifier of the predicted event, where the video analysis model is obtained by training with a live screen of a historical video.

Optionally, in the above possible implementation manner of the embodiment of the present application, the obtaining module 61 is further configured to obtain an accuracy of the predicted event.

The processing module 63 is further configured to optimize the video analysis model according to the accuracy of the predicted event.

Optionally, in another possible implementation manner of the embodiment of the present application, that the processing module 63 is configured to display, according to the identifier of the predicted event, the augmented reality (AR) data corresponding to the predicted event in a second video live screen of the second moment is specifically:

the processing module 63 is specifically configured to obtain the AR data corresponding to the predicted event according to the identifier of the predicted event, and superimpose the AR data on the second video information to control the AR data to be displayed on the second video live screen of the second moment.

Optionally, in the above possible implementation manner of the embodiment of the present application, that the processing module 63 is configured to obtain the AR data corresponding to the predicted event according to the identifier of the predicted event is specifically:

the processing module 63 is specifically configured to query an AR database according to the identifier of the predicted event, and determine the AR data corresponding to the predicted event.

Optionally, the AR database stores the AR data corresponding to various prediction events.

Optionally, in another possible implementation manner of the embodiment of the present application, the obtaining module 61 is further configured to, before the processing module 63 superimposes the AR data on the second video information, obtain the second video information corresponding to the second moment.

The processing module 63 is further configured to analyze the second video information to determine a current event in the second video information, and determine whether the current event is the predicted event.

Correspondingly, that the processing module 63 is configured to superimpose the AR data onto the second video information is specifically:

the processing module 63 is specifically configured to, superimpose the AR data on the second video information when the current event is the predicted event.

Optionally, in another possible implementation manner of the embodiment of the present application, that the obtaining module 61 is configured to obtain first video information corresponding to a first moment includes:

the obtaining module 61 is specifically configured to obtain at least two pieces of video information respectively collected by at least two video capture apparatuses at the first moment, perform integration processing on the at least two pieces of video information to obtain the first video information; where the at least two video capture apparatuses are video capture apparatuses that are disposed in a same scene but at different locations.

Optionally, the AR data may include textual data, chartlet data, voice data, and animation data.

Optionally, the live video is a live video of a sports game.

The apparatus provided by the embodiment of the present application can be used to perform the methods in the embodiments shown in FIG. 2 to FIG. 5. As the implementation principles and technical effects of the apparatus and the method are similar, details are not described herein again.

It should be noted that the division of respective modules of the above apparatus is only a division of a logical function, and all or part of respective modules may be integrated into one physical entity or physically separated in actual implementation. And all of these modules can be implemented by software invoking of processing component; or all of them can be implemented in hardware form; or some modules can be implemented by software invoking of processing component, and some modules are implemented in hardware form. For example, the determining module may be a separately set processing element, or may be integrated on a chip of the above apparatus. In addition, the determining module may be stored as program codes in the memory of the above apparatus, and be called by a processing unit of the above apparatus to implement the determining module's function. The implementations of other modules are similar to the implementation of the determining module. In addition, all or part of these modules can be integrated or implemented separately. The processing elements described herein can be an integrated circuit that has signal processing capabilities. In the implementation process, each step of the above method or each of the above modules may be completed by an integrated logic circuit of hardware in the processor element or by instructions in the form of software.

For example, the above modules may be one or more integrated circuits configured to implement the above methods, such as one or more application specific integrated circuits (ASICs), or one or more digital signal processors (DSPs), or one or more field programmable gate arrays (FPGAs). As another example, when one of the above modules is implemented by software code invoking of the processing element, the processing element can be a general purpose processor, such as a central processing unit (CPU)

or other processors that can invoke program codes. As another example, these modules can be integrated and implemented in the form of a system-on-a-chip (SOC).

In the above embodiments, all or part of the modules may be implemented by software, hardware, firmware, or any combination thereof. When implemented by software, all or part of the modules may be implemented in the form of a computer program product. The computer program product includes one or more computer instructions. When the computer program instructions are loaded and executed on a computer, the processes or functions described in accordance with embodiments of the present application are generated in whole or in part. The computer can be a general purpose computer, a special purpose computer, a computer network, or other programmable apparatuses. The computer instructions can be stored in a computer readable storage medium or transmitted from one computer readable storage medium to another, for example, the computer instructions can be transmitted from a website site, a computer, a server or a data center to another website site, computer, server, or data center by wire (e.g., a coaxial cable, an optical fiber, a digital subscriber line (DSL)) or wireless technologies (e.g., infrared, wireless, microwave, etc.). The computer readable storage medium may be any available media that can be accessed by a computer or a data storage device such as a server, data center, or the like that includes one or more available medium integrations. The available medium may be a magnetic medium (e.g., a floppy disk, a hard disk, a magnetic tape), an optical medium (e.g., a DVD), or a semiconductor medium (e.g., a solid state disk (SSD)) or the like.

Figure 7:
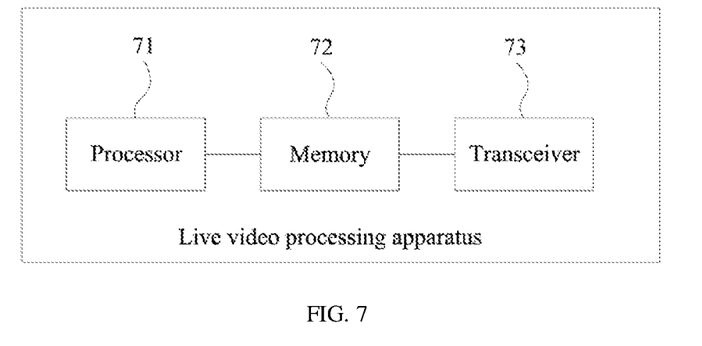
FIG. 7 is a schematic structural diagram of Embodiment 2 of a live video processing apparatus according to an embodiment of the present application.

FIG. 7 is a schematic structural diagram of Embodiment 2 of a live video processing apparatus according to an embodiment of the present application. As shown in FIG. 7, the live video processing apparatus may include a processor 71, a memory 72 and a computer program stored on the memory 72 and executable on the processor 71. When executing the program, the processor 71 implements the methods of the embodiments shown in FIG. 2 to FIG. 5 above.

Optionally, the live video processing device may further include a transceiver 73. The transceiver 73 may be implemented by a transmitter and a receiver, where the transmitter and the receiver may have independent functions and may be implemented by using an antenna or the like, which will not be limited in the embodiment of the present application.

Optionally, the obtaining module 61, the determining module 62, and the processing module 63 in the above FIG. 6 may correspond to the processor 71 in the embodiment of the present application.

Optionally, the embodiment of the present application further provides a storage medium, where the storage medium stores instructions which when executed on the computer cause the computer to execute the methods of the embodiments shown in FIG. 2 to FIG. 5 above.

Optionally, the embodiment of the present application further provides a chip for running instructions, where the chip is used to execute the methods of the embodiments shown in FIG. 2 to FIG. 5 above.

The embodiment of the present application further provides a program product, where the program product includes a computer program stored in a storage medium, and at least one processor can read the computer program from the storage medium. When executing the computer program, the at least one processor can implement the methods of the embodiments shown in FIG. 2 to FIG. 5.

The term "plurality" as used herein refers to two or more. The term "and/or" herein is merely used for describing an association between the associated objects, indicating that there may be three relationships. For example, A and/or B, may indicate 3 situations, i.e., A exists independently, both A and B exist simultaneously, and B exists independently. In addition, the character "/" in this article generally indicates that the associated objects have a relationship of "or"; in the formula, the character "/" indicates that the associated objects have a relationship of "division".

It is to be understood that the various reference numbers in the embodiments of the present application are only for convenience of description but not to be construed as limiting the scope of the embodiments.

It should be understood that, in the embodiments of the present application, the sequence numbers of the foregoing processes do not mean the execution order, and the execution order of each process should be determined by its function and internal logic. The sequence numbers should not be construed as limiting the implementation process of the embodiment of the present application.

Finally, it should be noted that the above embodiments are only for explaining the technical solutions of the present application, but not for limiting the technical solutions; although the present application has been described in detail with reference to the foregoing embodiments, those skilled in the art should understand that the technical solutions described in the foregoing embodiments may be modified, or some or all of the technical features may be equivalently substituted; and the modifications or substitutions do not make the essence of the corresponding technical solutions deviate from the scope of the embodiments of the present application.

What is claimed is:

1. A live video processing method, comprising:
   obtaining first video information corresponding to a first moment, the first video information comprising a first video live screen;
   determining, according to the first video information, an identifier of a predicted event corresponding to second video information, wherein the second video information corresponds to a second moment, and the second moment is after the first moment; and
   displaying, according to the identifier of the predicted event, augmented reality (AR) data corresponding to the predicted event in a second video live screen of the second moment;
   wherein the determining, according to the first video information, of an identifier of a predicted event corresponding to second video information comprises:
   performing analysis processing on the first video information to obtain the first video live screen; and
   inputting the first video live screen into a video analysis model for analysis to obtain the identifier of the predicted event, wherein the video analysis model is obtained by training with a live screen of a historical video;
   wherein the method further comprises:
   determining an accuracy of the predicted event by comparing the identifier of the predicted event with an identifier of an actual event occurring at the second moment; and
   optimizing the video analysis model according to the accuracy of the predicted event.

2. The method according to claim 1, wherein the displaying, according to the identifier of the predicted event, of AR data corresponding to the predicted event in a second video live screen of the second moment comprises:
obtaining the AR data corresponding to the predicted event according to the identifier of the predicted event;
superimposing the AR data onto the second video information; and
controlling the AR data to be displayed in the second video live screen of the second moment.

3. The method according to claim 2, wherein the obtaining of the AR data corresponding to the predicted event according to the identifier of the predicted event comprises:
querying an AR database according to the identifier of the predicted event, and determining the AR data corresponding to the predicted event.

4. The method according to claim 3, wherein the AR database stores AR data corresponding to various prediction events.

5. The method according to claim 3, wherein identifiers of predicted events and AR data corresponding to each of the identifiers are stored in the AR database.

6. The method according to claim 2, wherein before superimposing the AR data onto the second video information, the method further comprises:
obtaining the second video information corresponding to the second moment;
analyzing the second video information to determine a current event in the second video information;
determining whether the current event is the predicted event;
correspondingly, the superimposing of the AR data onto the second video information comprises:
superimposing the AR data on the second video information when the current event is the predicted event.

7. The method according to claim 2, wherein after superimposing the AR data onto the second video information, the method further comprises:
determining, according to characteristics of a specific event in the second video information, whether the AR data corresponds to the second video information;
the controlling the AR data to be displayed in the second video live screen of the second moment comprises:
controlling the AR data to be displayed in the second video live screen of the second moment when the AR data corresponds to the second video information.

8. The method according to claim 1, wherein the obtaining of first video information corresponding to a first moment comprises:
obtaining at least two pieces of video information respectively collected by at least two video capture apparatuses at the first moment, wherein the at least two video capture apparatuses are video capture apparatuses which are disposed in a same scene but at different locations; and
performing integration processing on the at least two pieces of video information to obtain the first video information.

9. The method according to claim 1, wherein the AR data comprises textual data, chartlet data, voice data, and animation data.

10. The method according to claim 1, wherein the live video is a live video of a sports game.

11. The method according to claim 1, wherein the video analysis model is configured to perform event prediction on a received video live screen.

12. The method according to claim 1, wherein the determining an accuracy of the predicted event by comparing the identifier of the predicted event with an identifier of an actual event occurring at the second moment comprises:
determining that the accuracy of the predicted event is inaccurate when the identifier of the predicted event is inconsistent with the identifier of the actual event; and
determining that the accuracy of the predicted event is accurate when the identifier of the predicted event is consistent with the identifier of the actual event;
the optimizing the video analysis model according to the accuracy of the predicted event comprises:
upon determining that the accuracy of the predicted event is inaccurate, inputting the first video live screen and the identifier of the actual event occurring at the second moment into the video analysis model, to optimize the video analysis model.

13. A live video processing apparatus, comprising: a processor and a computer-readable medium for storing program codes, which, when executed by the processor, cause the processor to:
obtain first video information corresponding to a first moment, the first video information comprising a first video live screen;
determine, according to the first video information, an identifier of a predicted event corresponding to second video information, wherein the second video information corresponds to a second moment, and the second moment is after the first moment; and
display, according to the identifier of the predicted event, augmented reality (AR) data corresponding to the predicted event in a second video live screen of the second moment;
wherein the program codes further cause the processor to perform analysis processing on the first video information to obtain the first video live screen, input the first video live screen into a video analysis model for analysis to obtain the identifier of the predicted event, wherein the video analysis model is obtained by training with a live screen of a historical video;
wherein
the program codes further cause the processor to determine an accuracy of the predicted event by comparing the identifier of the predicted event with an identifier of an actual event occurring at the second moment; and
optimize the video analysis model according to the accuracy of the predicted event.

14. The apparatus according to claim 13, wherein the program codes further cause the processor to obtain the AR data corresponding to the predicted event according to the identifier of the predicted event, superimpose the AR data onto the second video information, and control the AR data to be displayed in the second video live screen of the second moment.

15. The apparatus according to claim 14, wherein the program codes further cause the processor to query an AR database according to the identifier of the predicted event, and determine the AR data corresponding to the predicted event.

16. The apparatus according to claim 15, wherein the AR database stores AR data corresponding to various prediction events.

17. The apparatus according to claim 14, wherein
the program codes further cause the processor to obtain the second video information corresponding to the second moment before the processing module superimposes the AR data on the second video information;
analyze the second video information to determine a current event in the second video information;

determine whether the current event is the predicted event; and superimpose the AR data on the second video information when the current event is the predicted event.

18. The apparatus according to claim 13, wherein the program codes further cause the processor to obtain at least two pieces of video information respectively collected by at least two video capture apparatuses at the first moment, perform integration processing on the at least two pieces of video information to obtain the first video information; wherein the at least two video capture apparatuses are video capture apparatuses which are disposed in a same scene but at different locations.

19. The apparatus according to claim 13, wherein the AR data comprises textual data, chartlet data, voice data, and animation data.

20. A non-transitory computer readable storage medium, wherein the non-transitory computer readable storage medium stores instructions that, when run on a computer, cause the computer to perform the method according to claim 1.

* * * * *